(12) United States Patent
Sugiura et al.

(10) Patent No.: US 6,256,558 B1
(45) Date of Patent: Jul. 3, 2001

(54) VEHICLE DISPLAY SYSTEM WITH DRIVE ENFORCEMENT CONTROL

(75) Inventors: Wataru Sugiura, Anjo; Takehiro Kikuchi, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/216,915

(22) Filed: Dec. 21, 1998

(30) Foreign Application Priority Data

Jan. 19, 1998 (JP) .................................................. 10-007876

(51) Int. Cl.⁷ .............................. G05D 1/00; G06F 17/00; G06F 7/00
(52) U.S. Cl. .................................... 701/1; 701/2; 701/36; 340/532; 340/529; 340/825.31; 340/825.06; 340/825.5; 340/825.16
(58) Field of Search .............................. 701/1, 2, 36, 49; 340/407.1, 407.2, 532, 529, 573.1, 825.16, 825.17, 825.18, 825.31, 825.06, 825.5, 825.51

(56) References Cited

U.S. PATENT DOCUMENTS

| | | | |
|---|---|---|---|
| 4,485,375 | * 11/1984 | Hershberger | 340/576 |
| 5,235,217 | * 8/1993 | Kirton | 307/326 |
| 5,341,036 | * 8/1994 | Wheeler et al. | 307/328 |
| 5,453,929 | * 9/1995 | Stove | 701/1 |
| 5,471,389 | * 11/1995 | Hahlganss | 455/456 |
| 5,781,872 | * 7/1998 | Konishi et al. | 701/36 |
| 6,029,110 | * 2/2000 | Zuber et al. | 701/200 |

FOREIGN PATENT DOCUMENTS 5-38986    2/1993  (JP) .
5-164565   6/1993  (JP) .

* cited by examiner

Primary Examiner—Jacques H. Louis-Jacques
Assistant Examiner—Brian J. Broadhead
(74) Attorney, Agent, or Firm—Pillsbury Winthrop LLP

(57) ABSTRACT

A vehicle display system which keeps a driver from inputting data into the system while driving a vehicle, but which permits a person in the front passenger seat to perform the data input operations. A main ECU inhibits data input operations, such as map retrieval, destination setting, and telephone number input operations, when it determines that the driver is driving the vehicle, i.e., when the vehicle is moving. However, when the driver grips the steering wheel and thereby depresses drive enforcement releasing switches located on the vehicle steering wheel, the main ECU releases the drive enforcement state, thereby enabling passengers other than the driver to perform data input operations.

24 Claims, 6 Drawing Sheets

VEHICLE DISPLAY SYSTEM WITH DRIVE ENFORCEMENT CONTROL

CROSS-REFERENCE TO RELATED APPLICATION

The present invention is related to and claims priority from Japanese Patent Application Hei. 10-7876, the contents of which are incorporated herein by reference.

BACKGROUND OF THE INVENTION

1. Field of the Invention

The present invention relates generally to vehicle display systems, and more particularly to a vehicle display system that prevents the vehicle driver from inputting data while driving the vehicle, but that permits a person seated in the front passenger seat to input data while the vehicle is being driven.

2. Description of Related Art

Present vehicle display systems provide a useful and convenient means for displaying information such as navigation information, television information, telephone information and the like. A typical display unit is installed at or around the center of a vehicle instrument panel to permit a driver or a passenger seated in the front passenger seat to easily operate it.

As a safety measure, such a typical unit is designed so as not to permit complex input operations, such as retrieving a map, setting a destination or inputting a telephone number, during vehicle operation.

Meanwhile, Japanese Patent Application Laid-Open No. Hei. 5-164565 discloses a system that provides a releasing switch on the edge of an instrument panel that enables a person seated in the front passenger seat to perform system input operations as the vehicle is being driven.

However, in the above system, the person seated in the front passenger seat has to perform input operations while simultaneously pressing the release switch located at the edge of the instrument panel, thereby causing system operation to be difficult.

SUMMARY OF THE INVENTION

In view of the above, it is an object of the present invention to provide a vehicle display for a navigation system or the like that enables a person seated in the front passenger seat to input data with good operability while at the same time prevents the driver from inputting data while he or she drives the vehicle.

To achieve the above-mentioned object, a vehicular display system is provided with first and second switches on the left and right sides of a steering wheel, respectively. When a vehicle driver simultaneously releases both switches, the driver is prevented from inputting data into the system while the vehicle is being driven. When the switches are both depressed, the system is released from the prohibited, or drive enforcement, state. As both hands of the driver are fully occupied, the driver cannot perform an input operation. However, the passenger seated in the front passenger seat can easily perform an input operation without the need to correspondingly operate a prohibited state release switch.

According to a second embodiment, the display system includes a steering wheel switch located on a side of the steering wheel corresponding to the location of the display. The switch releases the prohibited state when depressed. In this embodiment, due to the switch location, the driver cannot perform an input operation with the hand not manipulating the switch, and thus the same effect as with the first embodiment is obtained.

In the above embodiments, an input operation may be inhibited even in a situation such as when a left or right turn is being made, as the prohibited state may be maintained for a predetermined period after the switch or switches was/were last manipulated.

The specific nature of the invention, as well as other objects, uses and advantages thereof, will clearly appear from the following description and from the accompanying drawings in which like numerals refer to like parts.

DETAILED DESCRIPTION OF THE PREFERRED EMBODIMENTS

Figure 1:
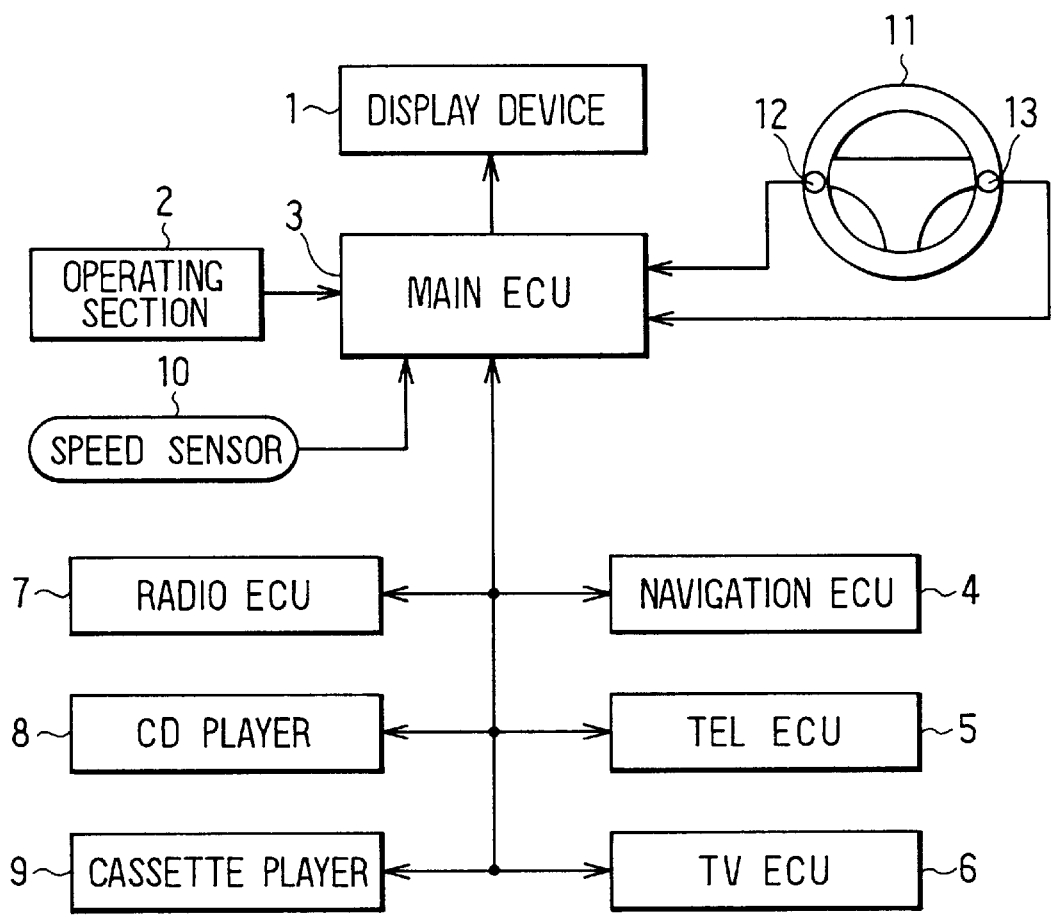
FIG. 1 is a block diagram showing the structure of a vehicular display system according to a first embodiment of the present invention.
Figure 2:
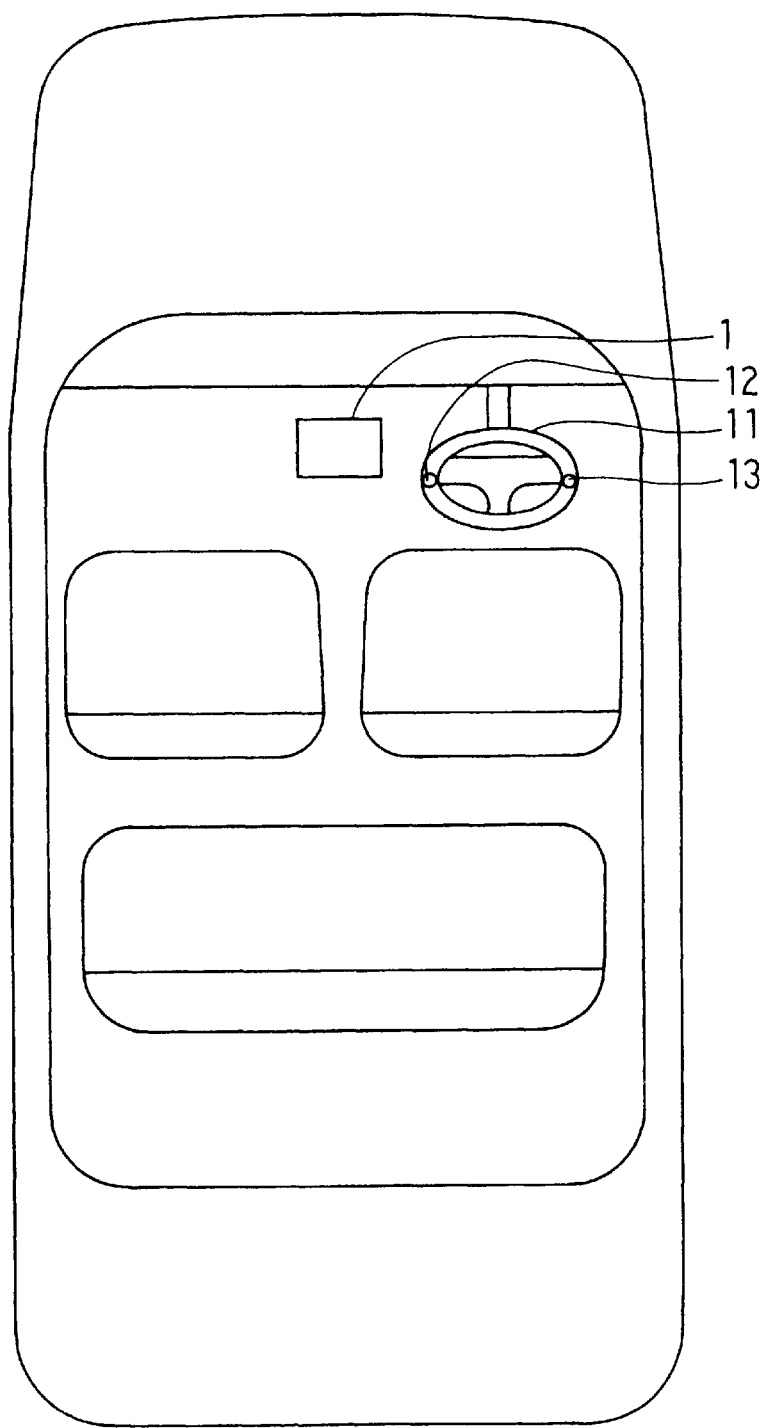
FIG. 2 is a diagram indicating where a display unit is installed.

FIG. 1 is a block diagram showing the structure of a vehicular display system according to a first embodiment of the present invention. A display unit 1 displays navigation information such as maps and current vehicle position, as well as other information, such as telephone and television information, and is installed around the center of an instrument panel within the interior of a vehicle as shown in FIG. 2. The display unit 1 may be a CRT display, a liquid crystal display or any other similar type of display used in motor vehicles.

An operating section 2 includes switches for switching among navigation, TV, and telephone screens, and touch switches for operating the display screens. Particularly, the touch switches enable a user to perform map retrieval, destination selection, telephone number input, and other specified functions, and is provided at the front face of the display unit 1.

Figure 3:
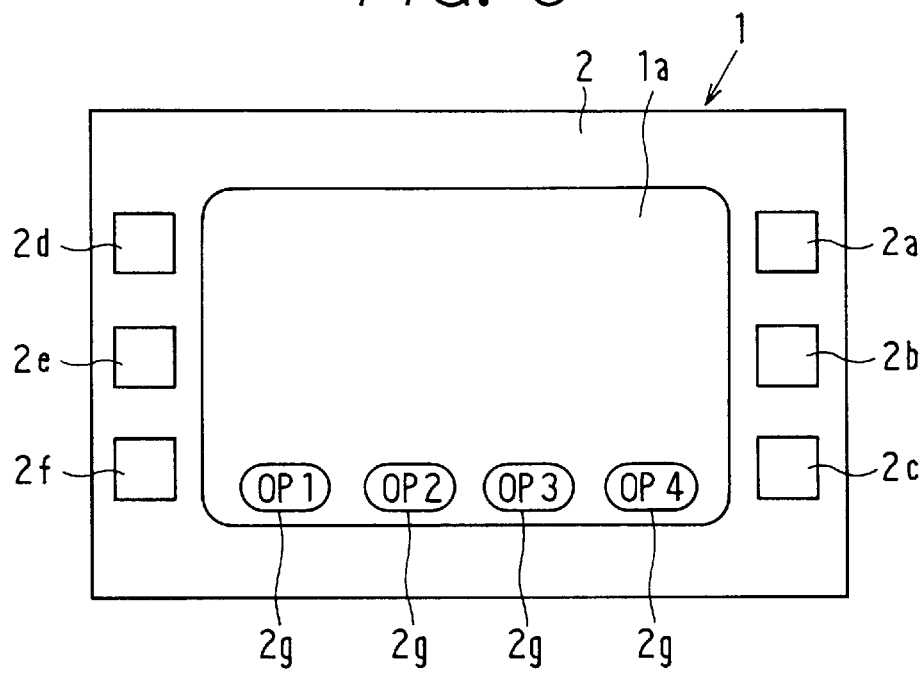
FIG. 3 is a diagram showing the structural appearance of the display unit and an operating section in FIG. 1.

FIG. 3 is a diagram showing the structural appearance of the display unit 1 and the operating section 2. The display unit 1 has a display screen 1a, and the operating section 2 is provided on a frame body (not shown) at the outer periphery of the front face of the display screen 1a. The operating section 2 includes several switches 2a–2e. The change-over switch 2a is operative to switch the display screen to the navigation screen. The change-over switch 2b enables the display screen to be switched to the telephone screen. The change-over switch 2c enables the display screen to be switched to the TV screen. The change-over switch 2d enables the display screen to be switched to the radio screen. Also, the change-over switch 2e enables the display screen to be switched to the music CD screen. Finally, the change-over switch 2f enables the display screen to be switched to the cassette screen.

The operating section 2 also includes touch switches 2g for detecting operations performed by a finger or the like on the display screen 1a. Each touch switch may be of the type well-known in the art, such as a transparent conductive film formed on a pair of glass substrates to detect contact position. Alternatively, each touch switch may, for example, be constructed to detect finger position by scanning a matrix with infrared rays to detect when light is blocked on the matrix.

Referring again to FIG. 1, a main control unit (ECU) 3 is connected with various control units such as a navigation ECU 4, a telephone (TEL) ECU 5, a TV ECU 6, a radio ECU 7, a CD player 8 and a cassette player 9. The ECU 3 sends a signal, corresponding to operation of the operating section 2, to a predetermined one of the control units, and receives display data from the predetermined one of the control units to cause the display unit 1 to display the data.

The navigation ECU 4 executes processes for displaying navigational information by specifying the current position of the vehicle from a signal from a GPS receiver (not shown) and by reading map data from a CD ROM. The navigation ECU 4 displays the switches for retrieving a map, for setting a destination and for inputting a telephone number and the like on the display screen 1a. The ECU also executes the processes for retrieving the map, for setting the destination and for inputting the telephone number and the like corresponding to operation of one of the touch switches at the position corresponding to one of the displayed switches when the screen change-over switch 2a is operated and when the display unit 1 displays navigational information.

The telephone ECU 5 controls outgoing and incoming calls, the TV ECU 6 controls a TV channel to be received, the radio ECU 7 controls a radio channel to be received, the CD player 8 reads and controls the playing of music CDs, and the cassette player 9 controls relay of a cassette tape, all in a manner well known in the art. These control units 5–9 cause the display unit 1 to display a screen related to each operation, along with the associated touch switches, in response to the respective screen change-over switches 2b–2f being operated. Subsequently, a control unit selected via one of the change-over switches performs one of the above-mentioned respective control functions in response to the operation selected via one of the touch switches 2g.

The main ECU 3 disables the input operations, such as the above-mentioned map-retrieval operation, the above-mentioned destination-setting operation, and the above-mentioned telephone number input operation, when it determines that the vehicle is being driven based on signal from a car speed sensor 10. Hereinafter, the action disabling the display screen input operation will be referred to as "drive enforcement".

In the present embodiment, drive enforcement releasing switches 12, 13 are provided on a steering wheel 11 to release the drive enforcement when depressed, thereby enabling a passenger other than the driver to perform an input operation. In this case, the drive enforcement releasing switches 12, 13 are provided respectively on the left and right sides of the vehicle steering wheel 11, as shown in FIG. 1. As the driver steers the vehicle during driving, he or she depresses the switches 12, 13 by gripping the steering wheel, and thereby sets the drive enforcement.

Figure 4:
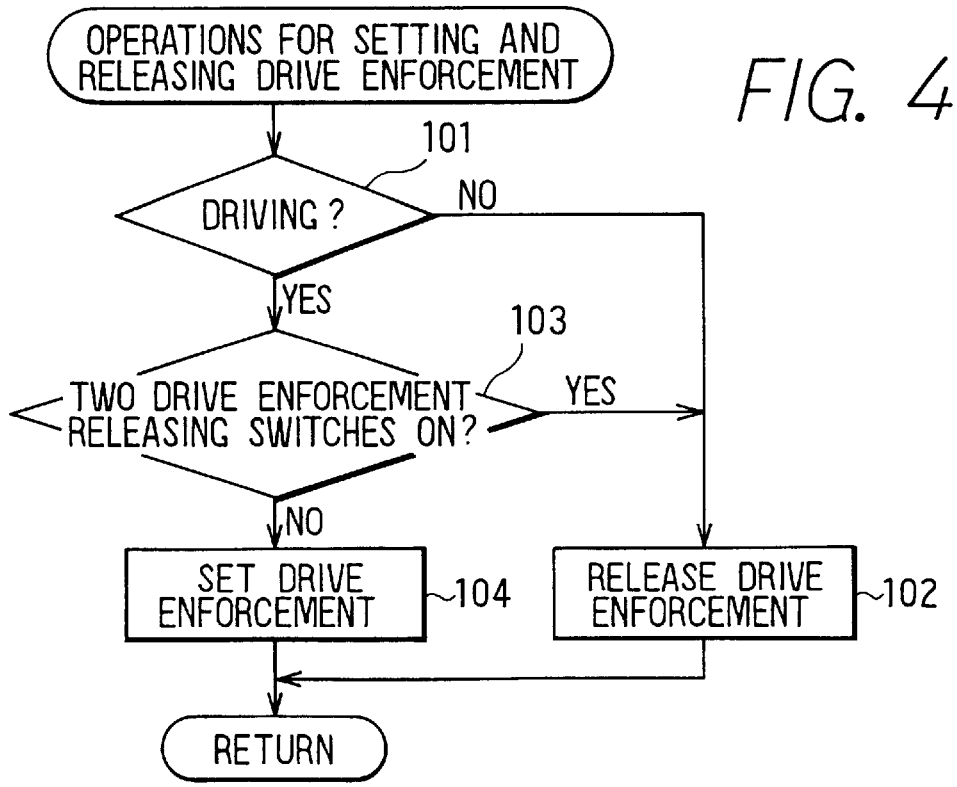
FIG. 4 is a flow diagram showing a drive enforcement control process performed by a main ECU in FIG. 1.

Referring next to the flow diagram in FIG. 4, the above-mentioned operations for setting and releasing drive enforcement will be explained.

At step 101, it is determined if the vehicle is running (e.g., if the vehicle is moving at a speed of 5 km/h or more) based on a signal from the car speed sensor 10. When the vehicle is not running, processing advances to step 102, and drive enforcement is released. Accordingly, a display input operation may be performed via the touch switches 2g at this time.

When processing determines the answer at step 101 to be YES, at step 103, it is determined if the drive enforcement releasing switches 12, 13 are depressed, and are therefore ON, simultaneously. When the drive enforcement releasing switches 12, 13 are not ON simultaneously, processing advances to step 104, causes the drive enforcement to be set, and causes a signal to be transmitted to the control units 4–9 indicating that the drive enforcement has been set. As a result, all input operations through the touch switches are disabled by erasing switches to be disabled from the screen 1a, or by differentiating disabled switches from the enabled switches via a color contrast. It should be noted that the screen change-over switches 2a–2f are operable, and the screen may be changed even during drive enforcement.

When the driver turns ON the drive enforcement releasing switches 12, 13 simultaneously in this state, the processing determination at step 103 is YES. Then, at step 102, drive enforcement is released. Subsequently, the control units 4–9 are informed that drive enforcement has been released. As a result, a normal state in which input operation by means of the touch switches is permitted is resumed.

At this time, although the driver cannot perform an input operation by means of the touch switches because the driver is simultaneously depressing the drive enforcement releasing switches 12, 13 with his or her hands, a person in the front passenger seat can perform the input operation by means of the touch switches, as he or she is not required to manipulate the drive enforcement releasing switches 12, 13.

In a conventional display system, while the driver is allowed to perform the input operation when the person in the front passenger seat presses the release switch, the system of the present embodiment inhibits this type of input operation during vehicle operation, i.e., during vehicle driving, as the drive enforcement switches 12, 13 are both depressed by the driver as the driver grasps the steering wheel.

In the foregoing embodiment, the drive enforcement release switches 12, 13 are located on the right and left sides of the steering wheel 11 corresponding to the driver's hand locations. However, the drive enforcement switch 13 on the right side may be provided at a location other than the steering wheel 11, e.g., at a location adjacent a power window switch.

Figure 5:
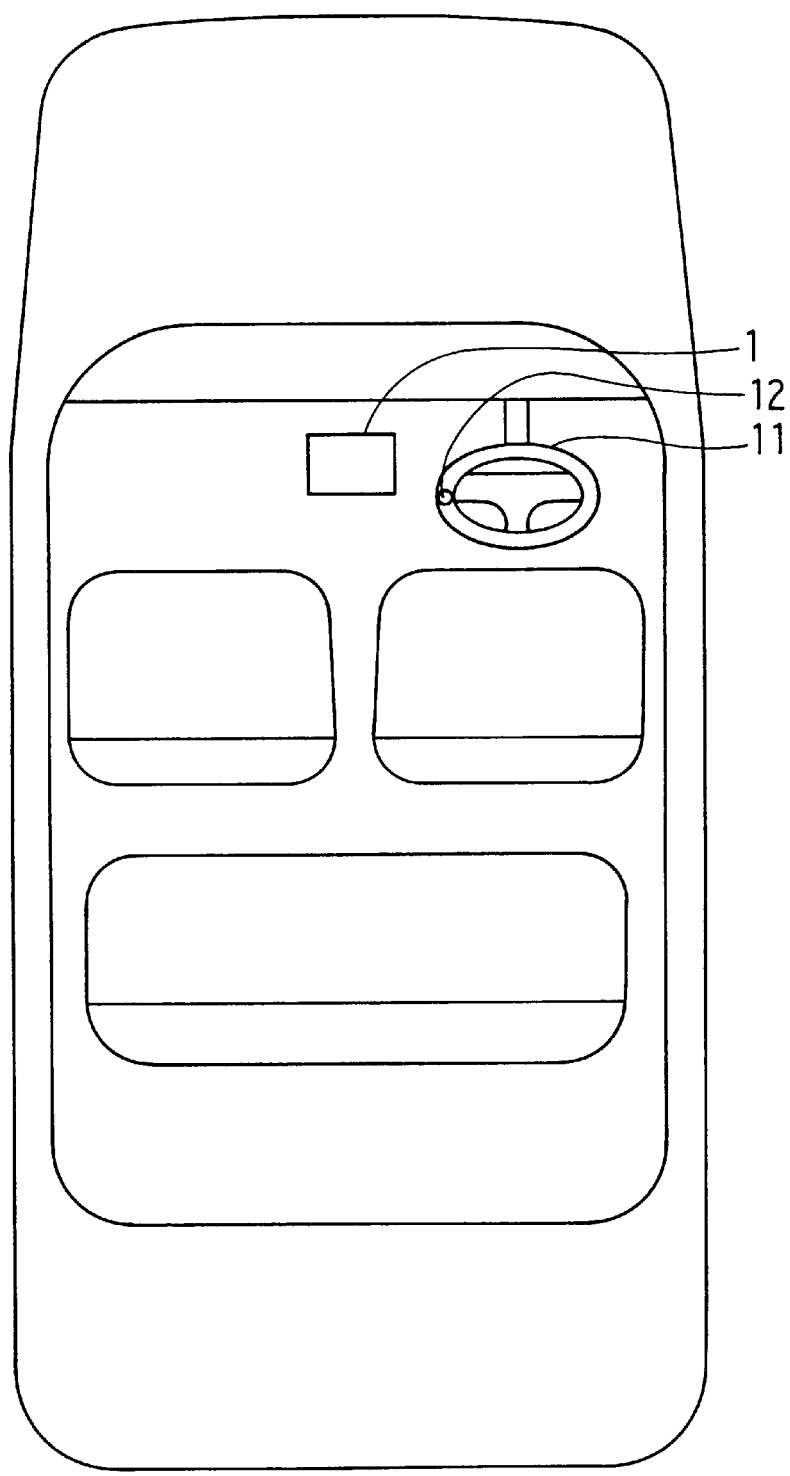
FIG. 5 is a diagram showing a second embodiment in which one drive enforcement releasing switch is installed.

It is also possible to provide the drive enforcement releasing switch 12 on the left side of the steering wheel 11 as shown in FIG. 5, thereby obviating the need for the two drive enforcement releasing switches 12, 13. In this case, it is possible to prevent the driver from reliably performing a display input operation, as the driver cannot operate the touch switch with his or her right hand while simultaneously depressing the drive enforcement releasing switch 12 on the left side of the steering wheel 11 with his or her left hand.

Further, when only one drive enforcement releasing switch is provided as described above, it may be provided at another location, e.g., near the power window switch. In short, the drive enforcement releasing switch should be provided at a position where the driver can operate it manually and where the driver cannot simultaneously operate the touch switches while manipulating the steering wheel 11.

The present invention may be applied to a vehicle having a steering wheel located on its left side in the same manner. In such a case, the drive enforcement releasing switches 12, 13 are located on the steering wheel 11 as shown, for example, in FIG. 6. It should be noted that when only one such drive enforcement releasing switch is provided in this embodiment, it should be provided on the right side of the steering wheel 11.

Figure 7:
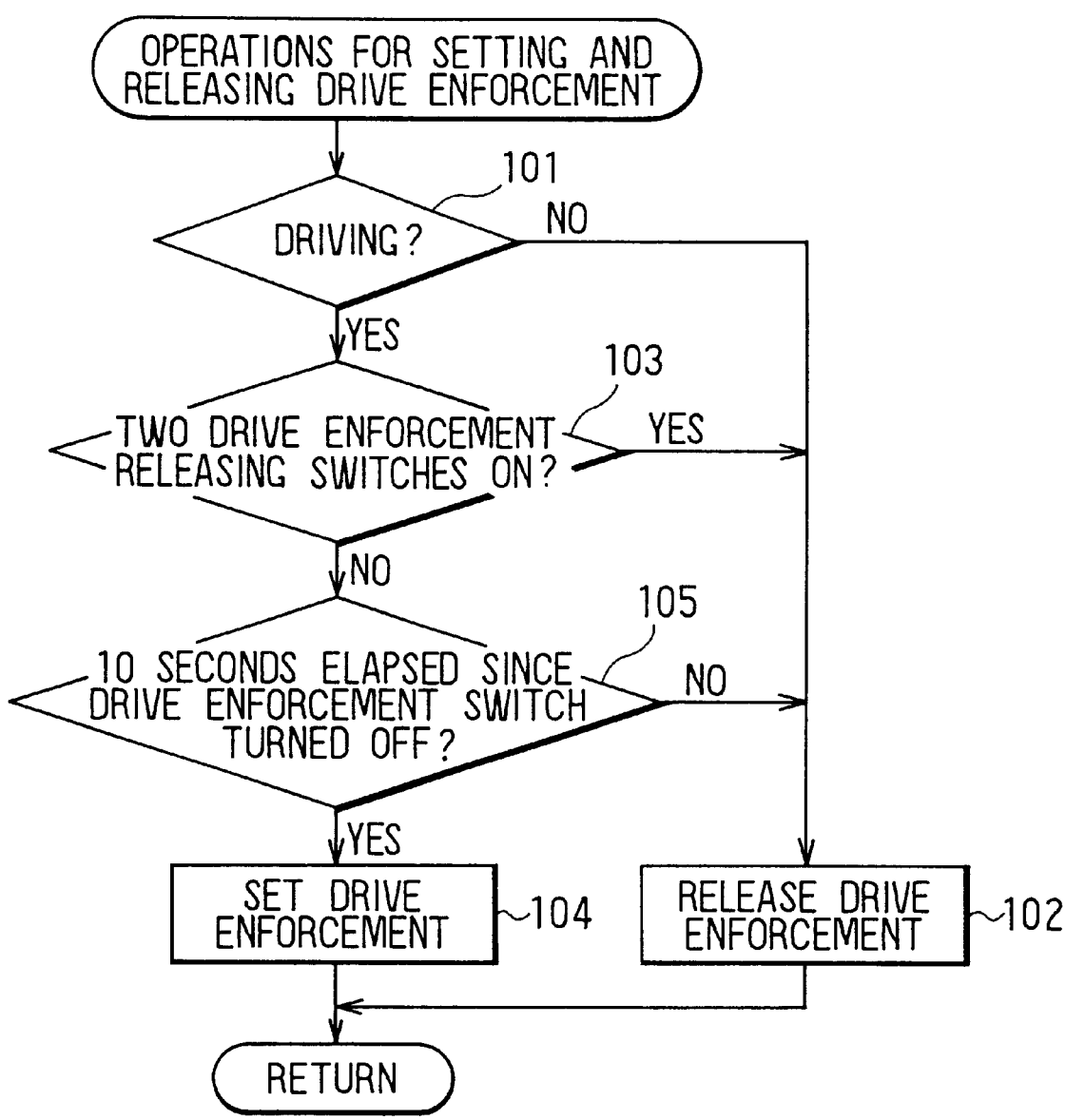
FIG. 7 is a flow diagram showing another example of the drive enforcement control process of the present invention performed by the main ECU.

Further, although a system that releases the drive enforcement state only when the drive enforcement releasing switch is pressed has been shown in the foregoing embodiment, the drive enforcement releasing switch may be released as the driver makes a right or left turn, as the switch/switches are not continuously depressed. However, the system may be configured so that the drive enforcement continues to be effective for a predetermined period of time even after the drive enforcement switch/switches has/have been released. For example, with reference to FIG. 7 when it is determined that the drive enforcement releasing switches 12, 13 are OFF at step 103, processing can be programmed to determine at step 105 whether a predetermined period of time, e.g., 10 seconds, has elapsed after the drive enforcement releasing switches 12, 13 have been released. Processing then returns to step 102 to continue the drive enforcement until the predetermined period elapses.

Referring again to FIG. 2, when it is determined from navigational information that the vehicle is being driven, it is possible to release the drive enforcement when one switch 12 on the left side is depressed, or ON, even if the right switch 13 is released, or OFF, because the driver cannot perform the input operation when the steering wheel is located on the right side of the vehicle. It should be noted that the drive enforcement may be released when the right switch 13 is ON, even if the left switch 12 is OFF, in a vehicle with a steering wheel located on its left side, as is shown in FIG. 6.

It is also possible that drive enforcement may be set even if the drive enforcement releasing switches are depressed, when it is determined from navigational information that the vehicle is running on a road which requires numerous right and left turns.

Further, although the system in the foregoing embodiment includes switches displayed on the screen and inputs made by touching a switch corresponding to that position, it is possible to provide a plurality of switches on in the operating section 2 shown in FIG. 3 without using the touch switches. For instance, the plurality of switches may be provided at upper and lower the parts of the operating section 2, and switches may be displayed on the screen corresponding to the switches to allow the input to be made by manipulating the switches located at the upper and lower parts of the operating section.

Figure 6:
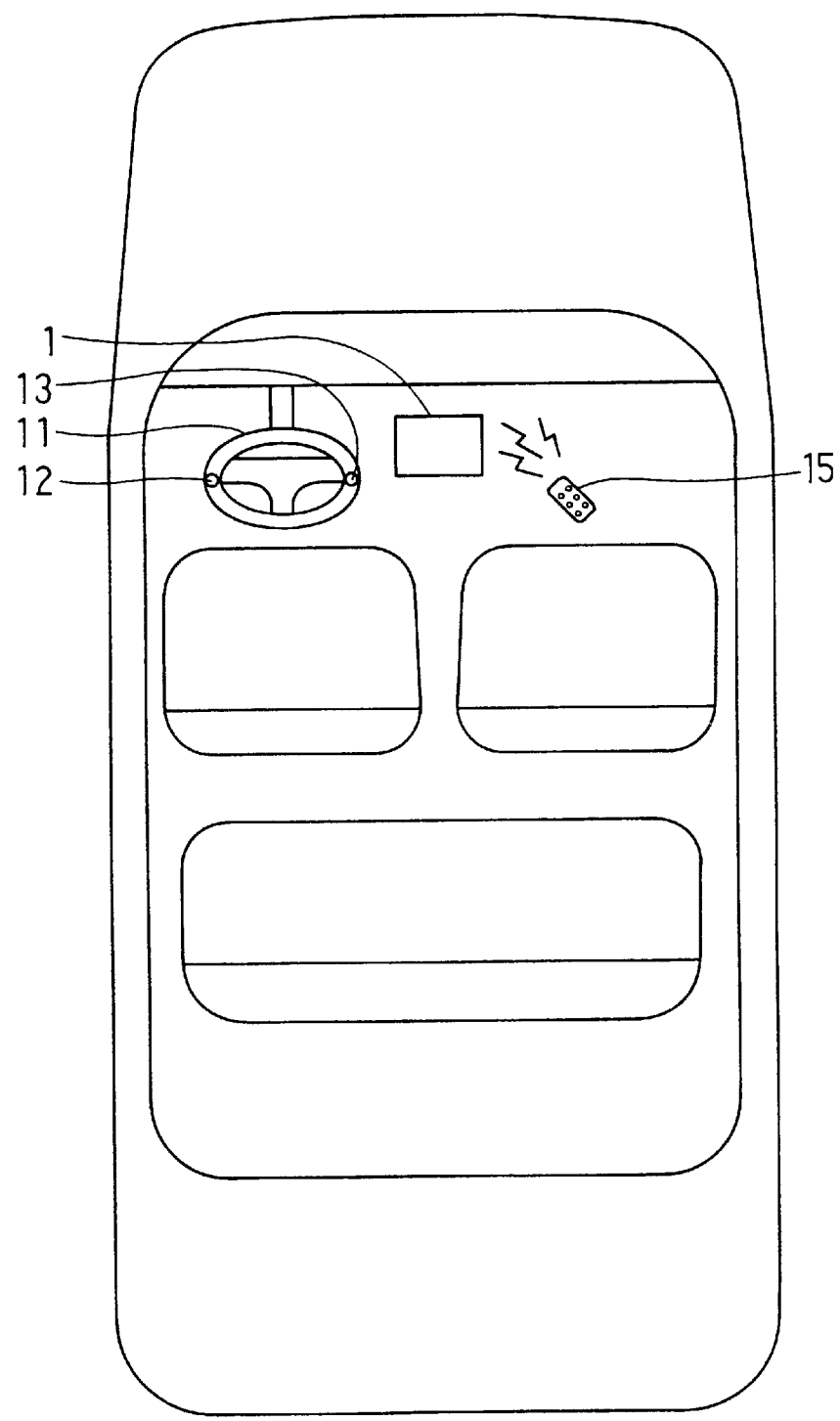
FIG. 6 is a diagram showing a third embodiment when the system is installed in a left-steering wheel car.

Because the both hands of the driver depress the drive enforcement releasing switches, except for the case shown in FIG. 5, in the foregoing embodiment, a remote controller, such as the remote control 15 in FIG. 6, separated from the display unit may be also used rather than the touch switches on the screen and the switches at the upper and lower parts of the operating section 2.

Further, although the foregoing embodiment discloses a system in which the operating section 2 is disposed in the vicinity of the display unit 1, the operating section may be separate from the frame body and disposed in the vicinity thereof.

Still further, the present invention is applicable in the same manner not only to the vehicular display system provided with the main ECU 3 and the various control units 4–9 as shown in the foregoing embodiments, but also to a vehicular display system having an individual control unit, e.g., a vehicular navigation system using the navigation ECU 4.

Finally, it is contemplated that the switches 12, 13 can be linked to other switches located on the steering wheel, such as a vehicle voice recognition starting switch or a stereo volume switch. For example, the above-mentioned switches may be enabled when only the switch 12 is operated, while the drive enforcement state may be released only when both switches 12, 13 are simultaneously depressed.

While the preferred embodiments have been described, variations thereto will occur to those skilled in the art within the scope of the present inventive concepts which are delineated by the following claims.

What is claimed is:

1. A vehicular display system, comprising:
   display means provided within an interior of a vehicle;
   operating means which allows data to be input via the display means;
   control means for controlling what is displayed on the display means based on the input data, and for disabling the operating means as a driver drives the vehicle by initiating a drive enforcement state, said control means being configured to release the drive enforcement state when the driver ceases to drive the vehicle; and
   drive enforcement release switching means positioned proximate a driver's location for operational access by said driver, wherein said drive enforcement release switching means is operable by the driver from the driver's location in the vehicle to deactivate the drive enforcement state while the vehicle is being driven;
   the control means enabling a passenger other than the driver to input the input data while the vehicle is being driven if the drive enforcement release switching means is being actuated by the driver.

2. The system of claim 1, wherein the drive enforcement release switching means comprises first and second switches located on left-hand and right-hand sides of the vehicle steering wheel, respectively, corresponding to hand placement locations of the driver.

3. The system of claim 1, wherein the drive enforcement release switching means comprises a single switch located on the vehicle steering wheel corresponding to a driver hand placement location.

4. The system of claim 3, wherein the switch is located on a side of the vehicle steering wheel corresponding to a location of the operating means.

5. The system of claim 1, wherein the drive enforcement release switching means is further operative to control switching functions in addition to said drive enforcement state.

6. The system of claim 1, wherein the operating means comprises a remote control.

7. The system of claim 1, wherein the control means continues to release the drive enforcement state for a predetermined period after the drive enforcement release switching means was last manipulated.

8. The system of claim 1, wherein the control means automatically enables the drive enforcement state when predetermined driving conditions are detected.

9. A vehicular display system as claimed in claim 1, wherein said drive enforcement release switching means is positioned on a steering wheel of the vehicle.

10. A vehicular display system as claimed in claim 1, wherein said drive enforcement release switching means is located on a side of the steering wheel proximate the operating means.

11. The system of claim 10, wherein the drive enforcement release switching means comprises a single switch located on the vehicle steering wheel corresponding to a driver hand placement location.

12. A vehicle information system, comprising:

a display located inside a vehicle;

a data input station provided in proximity to the display and which allows data input operations to be performed based on information on the display;

a controller for controlling the information on the display based on the performed data input operations, and for disabling the data input operations by activating a drive enforcement state while the driver drives the vehicle; and a drive enforcement release switch that, when manipulated by the driver, causes the controller to release the drive enforcement state so that a passenger other than the driver can input data through the data input station while the vehicle is being driven, said drive enforcement release switch being positioned at a location where said driver places at least one hand during normal operation of said vehicle.

13. The system of claim 12, wherein the drive enforcement release switch comprises first and second switches located on left-hand and right-hand sides of a vehicle steering wheel, respectively, corresponding to hand placement locations of the driver.

14. The system of claim 12, wherein the drive enforcement release switch comprises a single switch located on a vehicle steering wheel corresponding to a driver hand placement location.

15. The system of claim 12, wherein the drive enforcement release switch is located on a side of the vehicle steering wheel corresponding to a location of the data input station.

16. The system of claim 12, wherein the drive enforcement release switch is further operative to control switching functions in addition to the drive enforcement state.

17. The system of claim 12, wherein the data input station comprises a remote control.

18. The system of claim 12, wherein the controller continues to release the drive enforcement state for a predetermined period after the drive enforcement release switch was last manipulated.

19. The system of claim 12, wherein the controller automatically enables the drive enforcement state when predetermined driving conditions are detected.

20. The system of claim 12, wherein said location is on a steering wheel of said vehicle.

21. The system of claim 12, wherein the drive enforcement state remains active even when the drive enforcement release switch is actuated by the driver when said controller receives input indicating that the vehicle is traveling along a specified road, wherein said specified road is one having unstable driving conditions.

22. A method of controlling a vehicle data system, comprising the steps of:

determining whether a vehicle is being driven;

if the vehicle is not being driven, releasing a vehicle drive enforcement state to permit a vehicle driver or any other passenger of the vehicle to input data into the data system;

if the vehicle is being driven, determining whether a drive enforcement switch located for access from a vehicle driver position in a vehicle, is being actuated by a vehicle driver;

if the drive enforcement switch is being actuated by the vehicle driver while the vehicle is being driven, releasing said vehicle drive enforcement state so that a passenger other than the driver is permitted to input data into the data system; and if the drive enforcement switch is not being actuated by the vehicle driver while the vehicle is being driven, engaging said vehicle drive enforcement state to thereby inhibit the vehicle driver from inputting data into the data system.

23. The method of claim 22, further comprising the step of maintaining the vehicle drive enforcement state for a predetermined time period after actuation the drive enforcement switch ceases.

24. The method of claim 22, further comprising the step of automatically enabling the vehicle drive enforcement state based on detected driving conditions.

* * * * *